United States Patent
Reynolds et al.

(10) Patent No.: US 12,164,274 B2
(45) Date of Patent: Dec. 10, 2024

(54) ORIGINAL EQUIPMENT MANUFACTURER (OEM) DATA APPLICATION PROGRAMMING INTERFACE (API) TO MODEL REPOSITORY

(71) Applicant: Rockwell Automation Technologies, Inc., Mayfield Heights, OH (US)

(72) Inventors: Jordan C. Reynolds, Austin, TX (US); John J. Hagerbaumer, Mequon, WI (US); Troy W. Mahr, Pleasant Prairie, WI (US); Thomas K. Jacobsen, Wake Forest, NC (US); Giancarlo Scaturchio, Pisa (IT)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 286 days.

(21) Appl. No.: 17/826,689

(22) Filed: May 27, 2022

(65) Prior Publication Data
US 2023/0384746 A1  Nov. 30, 2023

(51) Int. Cl.
*G05B 17/02* (2006.01)
(52) U.S. Cl.
CPC .................... *G05B 17/02* (2013.01)
(58) Field of Classification Search
CPC .................... G05B 17/02; G05B 13/0265
See application file for complete search history.

(56) References Cited

U.S. PATENT DOCUMENTS

| | | | | |
|---|---|---|---|---|
| 10,216,177 B2* | 2/2019 | Gildert | ................... | G05B 19/42 |
| 11,740,624 B2* | 8/2023 | Ramamurthy | ....... | G05D 1/0088 |
| | | | | 701/2 |
| 2012/0158623 A1 | 6/2012 | Bilenko et al. | | |
| 2019/0102657 A1 | 4/2019 | Sayyarrodsari et al. | | |
| 2019/0354093 A1* | 11/2019 | Nguyen | ............. | G05B 19/4183 |
| 2020/0150638 A1 | 5/2020 | Mourzine et al. | | |
| 2021/0097456 A1 | 4/2021 | Sayyarrodsari et al. | | |
| 2021/0389748 A1 | 12/2021 | McAdam et al. | | |
| 2022/0292338 A1 | 9/2022 | Nair et al. | | |

(Continued)

OTHER PUBLICATIONS

Non-Final Office Action in U.S. Appl. No. 17/843,122, mailed Jul. 3, 2024, 61 pages.

*Primary Examiner* — Chad G Erdman

(57) ABSTRACT

Various embodiments of the present technology generally relate to industrial automation environments. More specifically, embodiments include systems and methods to train machine learning systems to perform autonomous control in an industrial automation environment. In some examples, a data aggregation component receives operational data from Original Equipment Manufacturer (OEM) devices, identifies a device type for the operational data, and transfers the operational data for the device type to a machine learning interface component. The operational data characterizes the operations of the OEM devices. The interface component receives the operational data for the device type and generates feature vectors based on the operational data configured for ingestion by a machine learning model. The interface component transfers the feature vectors to a machine learning model. The interface component receives a training indication from the machine learning model that indicates an autonomous control output for the device type of the OEM devices.

20 Claims, 7 Drawing Sheets

(56) References Cited

U.S. PATENT DOCUMENTS

| | | | |
|---|---|---|---|
| 2022/0388160 A1* | 12/2022 | Yonemoto | G05B 19/42 |
| 2022/0390515 A1 | 12/2022 | Pickerd et al. | |
| 2023/0145448 A1* | 5/2023 | Huber | G05B 23/024 |
| | | | 700/275 |

* cited by examiner

ORIGINAL EQUIPMENT MANUFACTURER (OEM) DATA APPLICATION PROGRAMMING INTERFACE (API) TO MODEL REPOSITORY

TECHNICAL FIELD

Various implementations disclosed herein relate to industrial automation technology, and to machine learning model training to perform autonomous control.

BACKGROUND

Industrial manufacturing environments generate huge quantities of data at fast speeds making the extraction of enterprise-level insights challenging. In industrial automation environments, control systems are used to drive various operations along an industrial line. Control programs are developed by programmers and comprise a set of program tags to carry out an industrial operation. The program tags comprise chunks of the control code and correspond to Original Equipment Manufacturer (OEM) devices like industrial assets, machinery, devices, and sensors. Control code is used by control systems like Programmable Logic Controllers (PLCs) to drive the OEM industrial assets, machinery, devices, and sensors in an industrial process. Industrial manufacturing environments typically comprise a large number of OEM assets, devices, and sensors and the amount of data generated is bother correspondingly large and diverse. Unfortunately, it is difficult to associate and organize the large and diverse data generated by the OEM assets, devices, machinery, and sensors. Moreover, industrial automation environments do not effectively or efficiently collate data generated by classes of OEM assets, devices, machinery, and sensors.

Machine learning algorithms are designed to recognize patterns and automatically improve through training and the use of data. Examples of machine learning algorithms include artificial neural networks, nearest neighbor methods, gradient-boosted trees, ensemble random forests, support vector machines, naïve Bayes methods, and linear regressions. A machine learning algorithm comprises an input layer and an output layer, wherein complex analyzation takes places between the two layers. Various training methods are used to train machine learning algorithms wherein an algorithm is continually updated and optimized until a satisfactory model is achieved. One advantage of machine learning algorithms is their ability to learn by example, rather than needing to be manually programmed to perform a task, especially when the tasks would require a near-impossible amount of programming to perform the operations in which they are used. However, given the large and diverse data sets generated by the OEM assets, devices, machinery, and sensors, industrial automation environments do not effectively and efficiently train machine learning models.

Overview

This Overview is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Various embodiments of the present technology generally relate to solutions for integrating machine learning models into industrial automation environments. Some embodiments comprise a system to train machine learning systems to perform autonomous control in an industrial automation environment. In some examples, the system comprises a data aggregation component and a machine learning interface component. The data aggregation component receives operational data from Original Equipment Manufacturer (OEM) devices, identifies a device type for the operational data, and transfers the operational data for the device type to a machine learning interface component. The operational data characterizes the operations of the OEM devices. The interface component receives the operational data for the device type and generates feature vectors based on the operational data configured for ingestion by a machine learning model. The interface component transfers the feature vectors to a machine learning model. The interface component receives a training indication from the machine learning model that indicates an autonomous control output for the device type of the OEM devices.

In some embodiments, an apparatus comprises computer readable storage media and processors operatively coupled with the computer readable storage media. The storage media store to train machine learning systems to perform autonomous control in an industrial automation environment. When the program instructions are executed by the processors, the computing apparatus receives operational data from OEM devices, identifies a device type for the operational data, and transfers the operational data for the device type to a machine learning interface component. The operational data characterizes the operations of the OEM devices. The computing apparatus component receives the operational data for the device type and generates feature vectors based on the operational data configured for ingestion by a machine learning model. The computing apparatus component transfers the feature vectors to a machine learning model. The computing apparatus component receives a training indication from the machine learning model that indicates an autonomous control output for the device type of the OEM devices.

Some embodiments comprise a method to train machine learning systems to perform autonomous control in an industrial automation environment. The method entails receiving operational data from OEM devices, identifying a device type for the operational data, and transferring the operational data for the device type to a machine learning interface component. The operational data characterizes the operations of the OEM devices. The method continues by receiving the operational data for the device type and generating feature vectors based on the operational data configured for ingestion by a machine learning model. The method continues by transferring the feature vectors to a machine learning model. The method continues by receiving a training indication from the machine learning model that indicates an autonomous control output for the device type of the OEM devices.

BRIEF DESCRIPTION OF THE DRAWINGS

Many aspects of the disclosure can be better understood with reference to the following drawings. The components in the drawings are not necessarily drawn to scale. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

Figure 1:
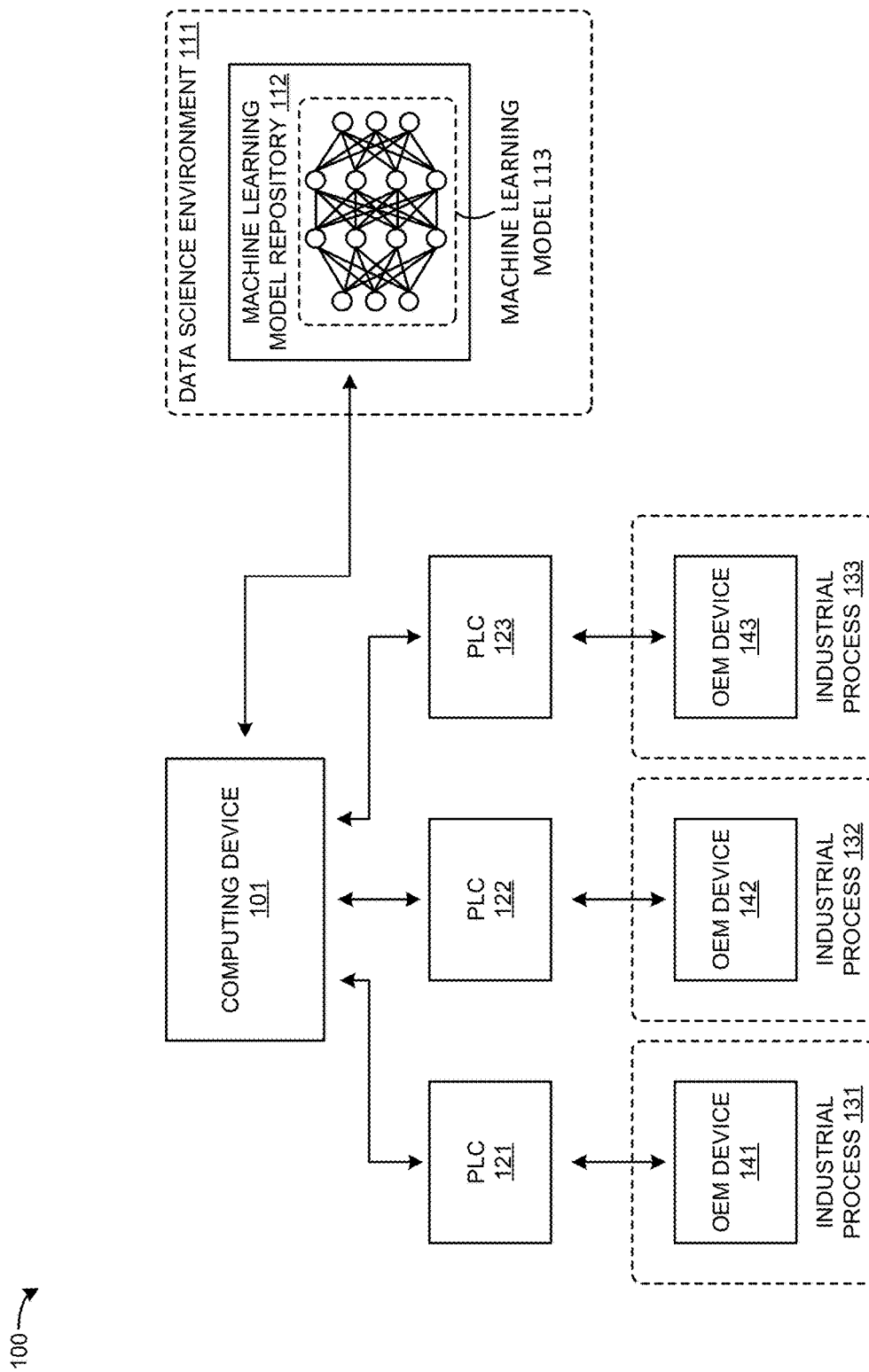
FIG. 1 illustrates an exemplary industrial automation environment to train machine learning systems to perform autonomous control.

The drawings have not necessarily been drawn to scale. Similarly, some components or operations may not be separated into different blocks or combined into a single block for the purposes of discussion of some of the embodiments of the present technology. Moreover, while the technology is amendable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Various embodiments of the present technology generally relate to solutions for integrating machine learning models into industrial automation environments. More specifically, embodiments of the present technology include systems and methods for collecting and organizing Original Equipment Manufacturer (OEM) data and building machine learning models using the OEM data. Generally, industrial controllers like Programmable Logic Controllers (PLCs) receive control programs for performing certain operations within an industrial environment. The controllers execute the control code to control downstream OEM devices within the industrial environment. The OEM devices comprise machinery integrated together which perform automated processes in response to control signaling received from the controllers.

The present technology serves to enhance industrial control by enabling the use of machine learning models within the industrial controllers for more advanced control. Industrial automation environments often fail to effectively integrate machine learning models to assist in the live control of OEM devices. However, machine learning models should be effectively trained to perform control operations if the models are integrated within industrial controllers. In an implementation of the present technology, OEM data is gathered and organized by device class. Feature vectors are then generated based on the OEM data and fed into a machine learning model to train the model for autonomous control of OEM devices that comprise the device class. For example, OEM data may be gathered from industrial dryers and this OEM data may be used to train a machine learning model to perform autonomous control of industrial dryers.

In accordance with the present disclosure, machine learning models may be connected with other elements within the industrial automation environment like design application servers in the programming environment or PLCs. In an embodiment, industrial controllers are connected to and control a range of OEM devices. The industrial controllers receive process data generated by the OEM devices and responsively call an Application Programming Interface (API) library to ingest the data. The APIs of the API library are organized by device class for the OEMs. The industrial controller calls the API that corresponds to the device class that generated the OEM data. The API receives the call and ingests the OEM data to construct a machine learning model to control that asset class of OEM device.

In accordance with the present disclosure, a machine learning model comprises one or more machine learning algorithms that are trained based on historical data and/or other types of training data. A machine learning model may employ one or more machine learning algorithms through which data can be analyzed to identify patterns, make decisions, make predictions, or similarly produce output that can inform control code and/or parameters. Examples of machine learning algorithms that may be employed solely or in conjunction with one another include artificial neural networks, nearest neighbor methods, ensemble random forests, support vector machines, naïve Bayes methods, linear regressions, or similar machine learning techniques or combinations thereof capable of predicting output based on input data. Determining which machine learning methods to use may depend on the specific purpose or functions required in a particular industrial setting. In some examples, a machine learning asset is integrated with an industrial controller and outputs control signaling that drives the industrial controller to control an OEM device.

Machine learning models may be deployed on premises in an industrial automation environment or off-site. For example, the machine learning model may be implemented in a data science environment and possess a data pipeline to receive OEM data from industrial controllers. Machine learning models inherently have a useful lifecycle as the environment around it changes. Over time, the models may wear out like any other machine or sensor on an industrial line. Thus, the machine learning assets disclosed herein may be periodically replaced and/or retrained to maintain the integrity of machine learning outputs.

To accompany the use of control program integrated models, corresponding faceplates, displays, Human Machine Interfaces (HMIs), and the like are contemplated herein to provide intuitive representations and interfaces to models on-site. A faceplate may comprise basic controls and/or visuals relevant to the to assist in training a model for deployment within the industrial environment. In this manner, machine learning can be brought into the on-site user experience. For example, an operator can view or use a kiosk within the industrial automation environment to perform a task such as reviewing machine learning control signaling, accessing model health, identifying model prediction accuracy, and/or other types of interaction with the machine learning model. The faceplate may also be useful for performing slightly more complex tasks such as offsetting parameters, providing inputs, tuning parameters of the model, overriding the model, or checking the status of the model.

Now referring to the Figures, FIG. 1 illustrates industrial automation environment 100 to train machine learning systems to perform autonomous control. Industrial automation environment 100 performs services like factory automation, factory control, machine control, smart manufacturing, machine communication and organization, and the like. Industrial automation environment 100 comprises computing device 101, data science environment 111, Programmable Logic Controllers (PLCs) 121-123, industrial processes 131-133, and Original Equipment Manufacturer (OEM) devices 131-133. Data science environment 111 comprises machine learning model repository 112 which hosts machine learning model 113. In other examples, industrial automation environment 100 may include fewer or additional components than those illustrated in FIG. 1. Likewise, the illustrated components of industrial automation environment 100 may include fewer or additional components, assets, or connections than shown. Each of computing device 101, user interface 103, and/or machine learning model repository 112 may be representative of a single computing apparatus or multiple computing apparatuses.

Computing device 101 comprises one or more computing apparatuses configured to host an application(s) to aggregate data received from PLCs 121-123 and to interface with machine learning model repository 112. It should be appreciated that the specific number of applications/modules hosted by computing device 101 is not limited. Exemplary applications hosted by computing device 101 to aggregate data comprise Application Programming Interface (API) libraries. Exemplary applications hosted by computing device 101 to interface with machine learning model repository 112 comprise feature extraction applications. Computing device 101 may comprise user interface components like displays, keyboards, touchscreens, tablets, and the like. The user interface components may display a Guided User Interface (GUI) that allows a user to interact with the application(s) hosted by computing device 101, including the data aggregation and machine learning interface applications.

Computing device 101 is coupled to data science environment 111. For example, the machine learning interface application hosted by computing device 101 may communicate with machine learning model repository 112. Machine learning model repository 112 hosts machine learning model 113. Machine learning model 113 is representative of any machine learning model implemented within industrial automation environment 100 as described herein. Machine learning model repository 112 is configured to receive training data from computing device 101 and generate machine learning model 113 based on the training data. The training data may comprise feature vectors generated based on process and operational data generated by OEM devices 141-143. Machine learning model 113 is trained to for autonomous control of OEM devices. For example, machine learning model 113 may receive training data for a class of OEM devices and once trained, is deployed to a PLC to control that class of OEM device.

Computing device 101 is communicatively coupled to PLCs 121-123. PLCs 121-123 are configured to execute control programs to implement industrial processes 131-133 respectively. PLCs 121-123 control the automated and coordinated operation of industrial processes 131-133. PLCs 121-123 may implement control programs that may be designed using any number of programming tools in an integrated design environment such as text-based coding, functional block diagrams, ladder logic, graphics-based programming, or other types of programming interfaces. The control code may be designed or programmed on a design computer running the integrated design environment, then transmitted or uploaded to PLCs 121-123. Alternatively, the control code may be implemented with a system of hardware connections in the PLC or in programmable PLC modules by which a PLC can be upgraded to add more control capacity as its industrial automation process grows in sophistication.

PLCs 121-123 control OEM devices 141-143 by sending power control commands over one or more data channels that support synchronous or asynchronous to implement industrial processes 131-133. Industrial processes 131-133 comprise OEM devices 141-143 respectively. Industrial processes 131-133 may constitute processes for manufacturing goods but may also comprise processes occurring within a utility plant (e.g., a nuclear power plant) or research or laboratory facility (e.g., a sample testing or processing facility). OEM devices 141-143 comprise factory or industrial machinery or manufacturing equipment such as conveyor belts or other conveyance mechanisms, robotic devices or other automated or programmable devices, packaging devices including boxing, capping, and sealing equipment, processing equipment, mixers, filling stations, quality control equipment, and other devices associated with manufacturing or other industrial processes. Industrial processes 131-133 may comprise different types of industrial processes. For example, industrial process 131 may comprise a chemical production process while industrial process 132 may comprise a food processing process.

OEM 141-143 are coupled to PLCs 121-123. OEM devices 141-143 receive control signaling from PLCs 121-123 and operate in response to the control signaling to implement their respective industrial processes. The control signaling drives actuators in OEM devices 141-143 that dictate the operations of OEM devices 141-143. For example, the control signaling may correspond to an actuator setting that sets a motor speed in OEM device 141 to a desired value. In this example, OEM devices 141-143 are representative of industrial equipment configured to implement industrial processes 131-133. OEM devices 141-143 comprise a class of OEM device implemented in different industrial process. For example, OEM devices 141-143 may each comprise electric motors. As OEM devices 141-143 operate in response to the control signaling, they generate OEM data which characterizes their operations. OEM devices 141-143 transfer the OEM data that they generate to PLCs 121-123. PLCs 121-123 responsively feed the OEM data to computing device 101.

Computing device 101, data science environment 111, PLCs 121-123, and industrial processes 131-133 communicate over various communication links using communication technologies like industrial ethernet, Institute of Electrical and Electronic Engineers (IEEE) 702.3 (ENET), IEEE 702.11 (WIFI), Bluetooth, Time Division Multiplex (TDM), Data Over Cable System Interface Specification (DOCSIS), Internet Protocol (IP), General Packet Radio Service Transfer Protocol (GTP), and/or some other type of wireline and/or wireless networking protocol. The communication links comprise metallic links, glass fibers, radio channels, or some other communication media. The links use ENET, WIFI, virtual switching, inter-processor communication, bus interfaces, and/or some other data communication protocols.

Computing device 101, machine learning model repository 112, PLCs 121-123, and OEM 141-143 comprise microprocessors, software, memories, transceivers, bus circuitry, and the like. The microprocessors comprise Central Processing Units (CPU), Graphical Processing Units (GPU), Application-Specific Integrated Circuits (ASIC), and/or the like. The memories comprise Random Access Memory (RAM), flash circuitry, disk drives, and/or the like. The memories store software like operating systems, user applications, radio applications, and network functions. The microprocessors retrieve the software from the memories and execute the software to drive the operation of industrial automation environment 100 as described herein.

Figure 2:
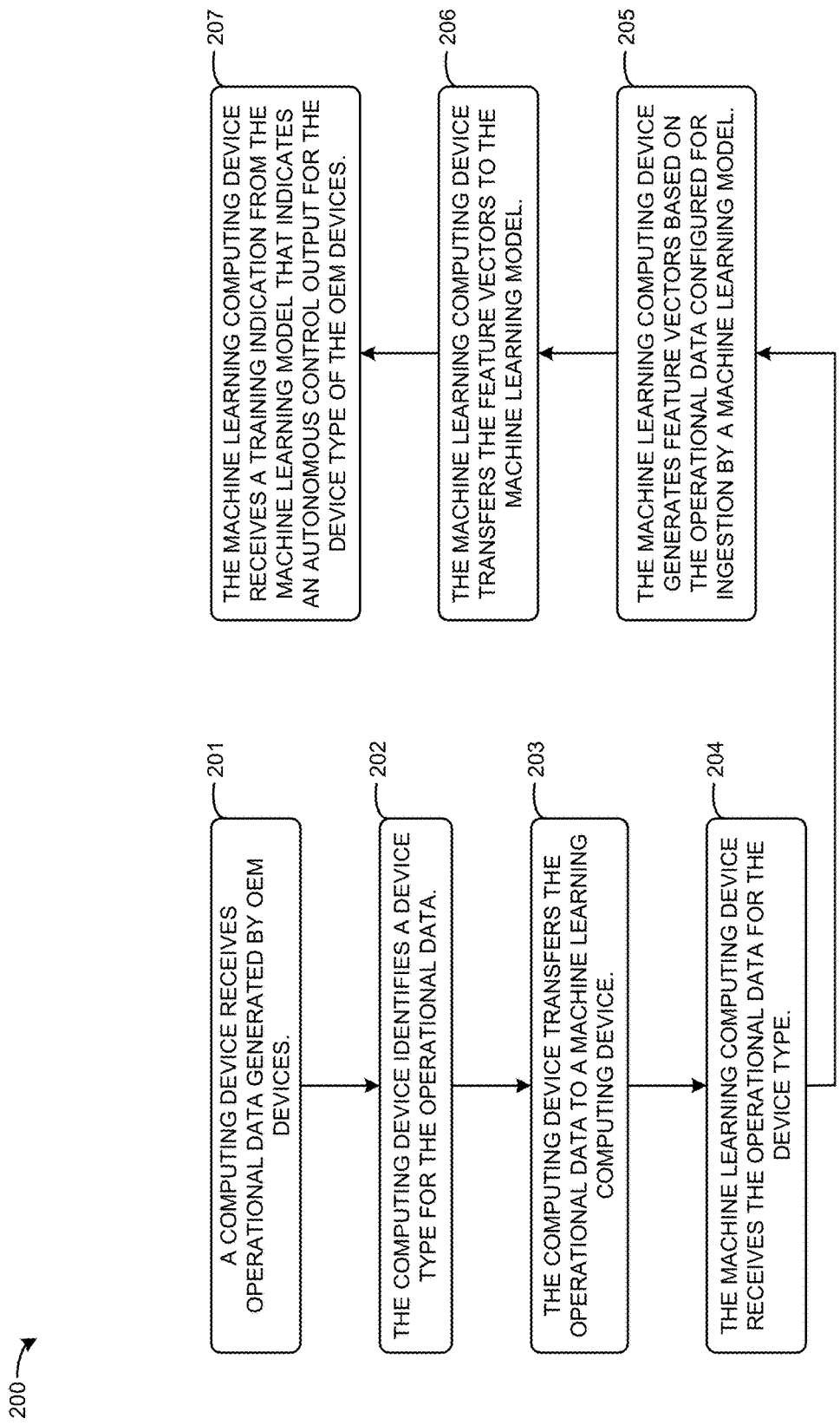
FIG. 2 illustrates an exemplary operation of an industrial automation environment to train machine learning systems to perform autonomous control.

In some examples, industrial automation environment 100 implements process 200 illustrated in FIG. 2. It should be appreciated that the structure and operation of industrial automation environment 100 may differ in other examples.

FIG. 2 illustrates process 200. Process 200 comprises a machine learning model training process to perform autonomous control. Program 200 may be implemented in program instructions in the context of any of the software applications, module components, or other such elements of one or more computing devices. The program instructions direct the computing device(s) to operate as follows, referred to in the singular for the sake of clarity.

In operation, a computing device receives operational data generated by OEM devices (201). The computing device identifies a device type of the operational data (202). The computing device transfers the operational data to a machine learning computing device (203). The machine learning computing device receives the operational data for the device type (204). The machine learning computing device generates feature vectors based on the operational data configured for ingestion by a machine learning model (205). The machine learning computing device transfers the feature vectors to the machine learning model (206). The Machine learning computing device receives a training indication from the machine learning model that indicates an autonomous control output for the device type for the OEM devices (207).

Referring back to FIG. 1, industrial automation environment 100 includes a brief example of process 200 as employed by one or more applications computing device 101 and data science environment 111. In operation, PLCs 121-123 receive and execute control programs to implement industrial processes 131-133. PLC s 121-123 generate and transfer control signaling to OEM devices 141-143 to implement industrial processes 131-133. For example, PLC 121 may transfer control signaling to OEM device 141 to implement an automated production process. OEM devices 141-143 receive the control signaling and operate in according to the control signaling. For example, the control signaling may dictate motor speeds, temperature levels, unit quantities, and/or other types of operating metrics. As OEM devices 141-143 operate, they generate OEM operational data that characterizes their operations. The OEM operational data may comprise data like rotations per minute over time, units produced over time, average operating temperature or pressure, and the like. OEM devices 141-143 report their OEM data to PLCs 121-123 respectively.

PLCs 121-123 receive the OEM operational data and responsively call the data aggregation application hosted by computing device 101. For example, the data aggregation application hosted by computing device 101 may comprise an API where each of the APIs corresponds to an OEM device type. PLCs, 121-123 may call the API that corresponds to the device type for OEM devices 141-143 to ingest the OEM data. The data aggregation application receives the calls and OEM operational data from PLCs 121-123 (step 201). The data aggregation application identifies the device type for the OEM operational data received from PLCs 121-123 (step 202). For example, the data aggregation application may determine the device type based on the call, the API that received the call, the OEM operational data, and/or some other method. Once the data aggregation application determines the device type for the OEM data, the application transfers the OEM data to a machine learning interface application hosted by computing device 101 (step 203). The data aggregation application indicates the OEM device type for the OEM data to the interface application.

The machine learning interface application receives the operational data from the aggregation application (step 204) and responsively generates feature vectors based on the operational data (step 205). The feature vectors are configured for ingestion by machine learning model 113. For example, the interface application may implement a feature extraction process on the OEM operational data to generate derivative values. The derivative values may comprise numeric values that represent various aspects of the operational data. For example, a set of derivative values may represent average operating temperatures indicated by the OEM data. The interface application may combine the features to generate feature vectors that represent the OEM data. Each feature vector may comprise a set of derivative values. The machine learning interface application hosted by computing device 101 transfers the feature vectors to machine learning model repository 112 (step 206). Model repository 112 receives the vectors and trains machine learning model 113 using the vectors. For example, machine learning model 113 may ingest the feature vectors and train its constituent machine learning algorithms using the ingested feature vectors. In some examples, model repository 112 trains model 113 to perform autonomous for the OEM device type associated with the OEM data (e.g., OEM devices 141-143).

Machine learning model 113 outputs a training indication that indicates an autonomous control output for the device type of OEM devices 141-143. Machine learning model repository transfers the training indication to the interface application hosted by computing device 101. The interface application receives the training indication (step 207). A user may view the training indication via user interface components of computing device 101. If a user determines the training state of model 113 is satisfactory, the interface application may flag model 113 as ready for deployment. Alternatively, if the user determines model 113 is not sufficiently trained, interface application may flag the model 113 for further training.

When machine learning model 113 is sufficiently trained for autonomous control operations, model 113 may be deployed to PLCs 121-123 to control the operations of OEM devices 141-143. For example, PLCs 121-123 may host model 113 and comprise Application Specific Integrated Circuits (ASICs) or Field Programmable Gate Arrays (FPGAs) configured to implement machine learning functions (e.g., feature extraction and model hosting). PLCs 121-123 may receive additional operational data from OEM devices 141-143. Model 113 may ingest the additional OEM operational data as machine learning inputs, process the inputs, and generate machine learning outputs that comprise control signaling which governs the operation of OEM devices 141-143. The control signaling may keep OEM devices within preferred operating ranges by autonomously manipulating Proportional Integral Derivative (PID) control values of OEM devices 141-143, however the specific type of control scheme is not limited and may depend on the specific type of industrial process being implemented. Once trained, model 113 may control OEM devices 141-143 with little to no human support.

Advantageously, industrial automation environment 100 effectively and efficiently trains machine learning models to perform autonomous control of OEM devices. Moreover, industrial automation environment 100 implements trained machine learning models in PLCs to autonomously control OEM devices.

Figure 3:
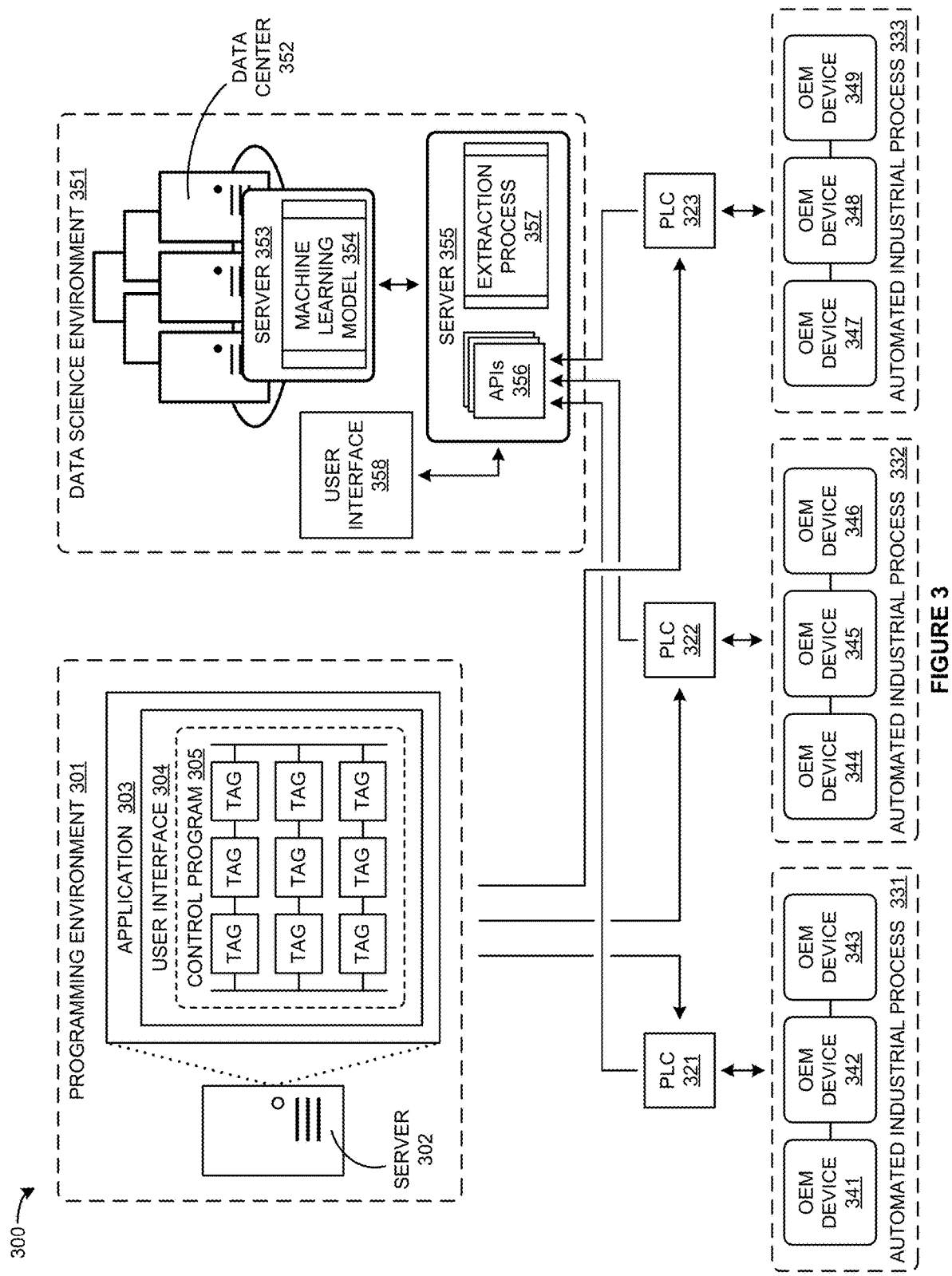
FIG. 3 illustrates an exemplary industrial automation environment to train machine learning systems to perform autonomous control.

FIG. 3 illustrates an industrial automation environment 300 to train a machine learning model to perform autonomous control. Industrial automation environment 300 comprises an example of industrial automation environment 100, however environment 100 may differ. Industrial automation environment 300 comprises programming environment 301, Programmable Logic Controller (PLCs) 321-323, automated industrial processes 331-333, and data science environment 351. Programming environment 301 comprises server 302, application 303, user interface 304, and control program 305. Control program 305 comprise program tags and is representative of a ladder logic diagram configured for ingestion by a PLC. Automated industrial process 331 comprises Original Equipment Manufacturer (OEM) devices 341-343, automated industrial process 332 comprises OEM devices 344-346, and automated industrial process 333 comprises OEM devices 347-349. Data science environment 351 comprises data center 352, server 353, machine learning model 354, server 355, Application Programming Interface (API) library 356, extraction process 357, and user interface 358.

Programming environment 301 is representative of one or more computing devices integrated into a network configured to generate control instructions for industrial automation environment 300 and that communicate with data science environment 351. Programming environment 301 comprises server 302. Server 302 comprises one or more computing device configured to host application 303. The one or more computing devices that comprise server 302 comprise processors, bus circuitry, storage devices, software, and the like. The processors may comprise Central Processing Units (CPUs), Graphical Processing Units (GPUs), Application Specific Integrated Circuits (ASICs), and the like. The storage devices comprise flash drives, Random Access Memory (RAM), Hard Disk Drives (HDDs), Solid State Drives (SSDs), Non-Volatile Memory Express (NVMe) SSDs, and the like. The storage devices store the software. The processors may retrieve and execute software stored on the storage devices to drive the operation of application 303.

Application 303 is representative of one or more design applications, user interface applications, operating systems, modules, and the like. Application 303 is configured to receive user inputs via user interface 304 and generate control program 305 based on the user inputs and/or other types of inputs.

User interface 304 is representative of a display that provides a graphical representation of application 303. The graphical representation may include one or more visual indicators relevant to control program 305, such as visual indicators of visual code blocks, ladder logic, code chunks, functional block diagrams, machine learning optimizations, and/or other types of visual indictors. User interface 304 may comprise a faceplate for viewing or use by an operator or similar user within programming environment 301. User interface 304 may include a computer, a mobile device, a kiosk, a touchscreen device, a Human Machine Interface (HMI) or some other type of computing device capable of performing the user interface functions described herein. A user may interact with application 303 via user interface 304 to generate control program 305.

PLCs 321-323 are representative of industrial controllers configured to execute control programs (e.g., control program 305) to implement automated industrial processes 331-333. PLCs 321-323 comprises one or more computing devices. The one or more computing devices of PLCs 321-323 comprise processors, bus circuitry, storage devices, software, and the like. The processors may comprise CPUs, GPUs, ASICs, FPGAs, and the like. The storage devices comprise flash drives, RAM, HDDs, SSDs, NVMe SSDs, and the like. The storage devices store the software. The processors may retrieve and execute software stored on the storage devices to drive the operation of PLCs 321-323. In some examples, the computing devices of PLCs 321-323 are configured to host and implement machine learning models to assist in implementing and controlling automated industrial processes 331-333.

PLC 321 is coupled to application 303 and to OEM devices 341-343, PLC 322 is coupled to application 303 and to OEM devices 344-346, and PLC 323 is coupled to application 303 and to OEM devices 347-349. PLCs 321-323 receive and execute control programs like control program 305 from application 303 to control the operation of OEM devices 341-349. The program tags that constitute control program 305 comprise industrial control code that provide instructions for PLCs 321-323 to control the operations of their respective OEM devices. For example, PLC 321 may receive control program 305 and identify which tags of control program 305 correspond to the ones of OEM devices 341-343. For example, PLC 321 may determine the tags are on a ladder logic rung for OEM device 332 and may implement the control instructions of the tags to activate the various components of OEM device 332.

Automated industrial processes 331-333 are representative of various industrial processes that operate according to control code generated in programming environment 301. The industrial processes may comprise a manufacturing process, chemical production process, food processing process, or any other type of automated industrial process. Although automated industrial processes 331-333 are each depicted comprising three industrial OEM devices, in other examples process 331-333 may comprise a different number of OEM devices. Automated industrial processes 331-333 may comprise similar or distinct industrial processes.

OEM devices 341-349 may comprise devices like pumps, compressors, heat exchanges, centrifuges, mills, conveyers, filters, and the like. OEM devices 341-349 may comprise subcomponents (not illustrated for clarity) like motors, valves, actuators, electrical circuitry, processing circuitry, storage circuitry, transceivers, machined parts, and the like.

OEM devices 341-343 are coupled to PLC 321, OEM devices 344-346 are coupled to PLC 322, and OEM devices 347-349 are coupled to PLC 323. PLCs 321-323 transfer control signaling generated in response to the executed program instructions to their respective ones of automated industrial processes 331-333. OEM devices 341-349 receive the control signaling and responsively operate accordingly. For example, OEM device 341 may comprise an electric motor to drive a pump. PLC 321 may execute the control instructions and determine a current level to power the electric motor at to achieve a desired pressure differential in the pump. PLC 321 may transfer control signaling to an actuator in the motor in OEM device 332. The actuator in the motor in OEM device 332 may receive the control signaling and apply the apply electric current to achieve the power level for the electric motor to drive the motor at the speed necessary to achieve the desired pressure differential.

As OEM devices 341-349 operate based on the control signaling, they generate OEM process data. The OEM data indicates the status of variables, operations, and/or processes of OEM devices 341-349. For example, OEM device 344 may comprise a reaction chamber and may generate OEM data that indicates chamber pressure over time. OEM devices 341-349 report OEM process data to PLCs 321-323. For example, OEM device 349 may comprise a furnace and may continuously report its temperature, pressure, ad reaction kinetics information to PLC 323 as operational process data. PLCs 321-323 reports the operational process data to data science environment 351. The chain of data reporting forms a data pipeline between OEM devices 341-349 to data science environment 351.

Data science environment 351 comprises data center 352. Data center 352 is representative of one or more computing devices integrated into a network that communicates with PLCs 321-323. Examples of data center 352 may include server computers and data storage devices deployed on-premises, in the cloud, in a hybrid cloud, or elsewhere, by service providers such as enterprises, organizations, individuals, and the like. Data center 352 may rely on the physical connections provided by one or more other network providers such as transit network providers, Internet backbone providers, and the like to communicate with PLCs 322. Data center 352 comprises server computer 353, server computer 355, and user interface 358. Server computer 353 hosts machine learning model 354. Server computer 355 hosts API library 356 and extraction process 357.

Server computers 353 and 355 comprises processors, bus circuitry, storage devices, software, and the like configured to host machine learning model 354. The processors may comprise CPUs, GPUs, ASICs, FPGAs, and the like. The storage devices comprise flash drives, RAM, HDDs, SSDs, NVMe SSDs, and the like. The storage devices store the software. The processors may retrieve and execute software stored on the storage devices to drive the operation of machine learning model 354, API library 356, and extraction process 357.

Machine learning model 354 is hosted on server computer 353. Machine learning model 354 comprises one or more machine learning algorithms that are trained to perform autonomous control for automated industrial processes 331-333. Machine learning model 354 may employ one or more machine learning algorithms through which data can be analyzed to identify patterns, make decisions, make predictions, or similarly produce output that can inform control signaling sent to OEM devices 341-349. Examples of machine learning algorithms that may be employed solely or in conjunction with one another include artificial neural networks, nearest neighbor methods, ensemble random forests, support vector machines, naïve Bayes methods, linear regressions, or other types of machine learning algorithms that predict output data based on input data. Determining which machine learning methods to use may depend on the specific purpose or functions required in a particular industrial setting. Machine learning model 354 may ingest training data generated based on the operations of OEM devices 341-340 to train itself. Machine learning model 354 may utilize supervised learning methods, unsupervised learning methods, and/or reinforcement learning methods to train itself. The training data may comprise feature vectors that comprise numeric representations of the training data. For example, a feature vector may represent operational data for a class of OEM devices of OEM devices 341-349. The feature vectors may comprise derivative values that represent performance metrics, variable ranges, and/or other training data.

API library 356 is hosted by server 355. API library 356 comprises a set of APIs that correspond to different device classes of OEM devices 341-349. For example, one of the APIs of API library 356 may correspond to industrial dryers while another one of the APIs of API library 356 may correspond to electric motors. PLCs 321-323 may call APIs of API library 356 to ingest OEM operational data based on the device class that produced the OEM data. For example, OEM device 341 may comprise a dryer and PLC 321 may call the API of APIs 356 for dryers. Alternatively, API library 356 may receive calls from PLCs 321-323 that indicate the device class for the OEM data and API library 356 may associate the calls with individual APIs based on the device class. By implementing an API library with individual APIs that correspond to OEM device classes, data science environment 351 can effectively and efficiently organize OEM data by class and train machine learning models to autonomously control different classes of OEM devices.

Extraction process 357 is hosted by server 355. Extraction process 357 is representative of a machine learning interface application. Extraction process 357 may calculate derivative values for OEM operational data received by API library 356. Extraction process 357 may then form feature vectors based on the derivative values to represent the OEM data. Extraction process 356 generates feature vectors by device class and transfers the feature vectors to machine learning model 354 to train the model to control that class of OEM device. For example, an API for electric motors of API library 356 may receive OEM data generated by electric motors and transfer that OEM data to extraction process 357. Extraction process 357 may then generate feature vectors that represent electric motor OEM data to train machine learning model 354 to control electric motor OEM devices.

User interface 358 is coupled to server 355 and is representative of a display that provides a graphical representation of API library 356, extraction process 357, and model status for machine learning model 354. User interface 304 may include a computer, a mobile device, a kiosk, a touchscreen device, a Human Machine Interface (HMI) or some other type of computing device capable of performing the user interface functions described herein. Server 355 may receive training outputs generated by machine learning model 354. User interface 358 may display the outputs on user interface 358 so that a user may assess the training state of machine learning model 354. When a user determines that machine learning model 354 is sufficiently trained (e.g., the model's prediction accuracy exceeds a performance threshold), the user may mark machine learning model 354 as ready for deployment. In response to the determination, server 355 may deploy machine learning model 354 to PLCs 321-323 to control OEM devices for the device class model 354 was trained to control.

Figure 4:
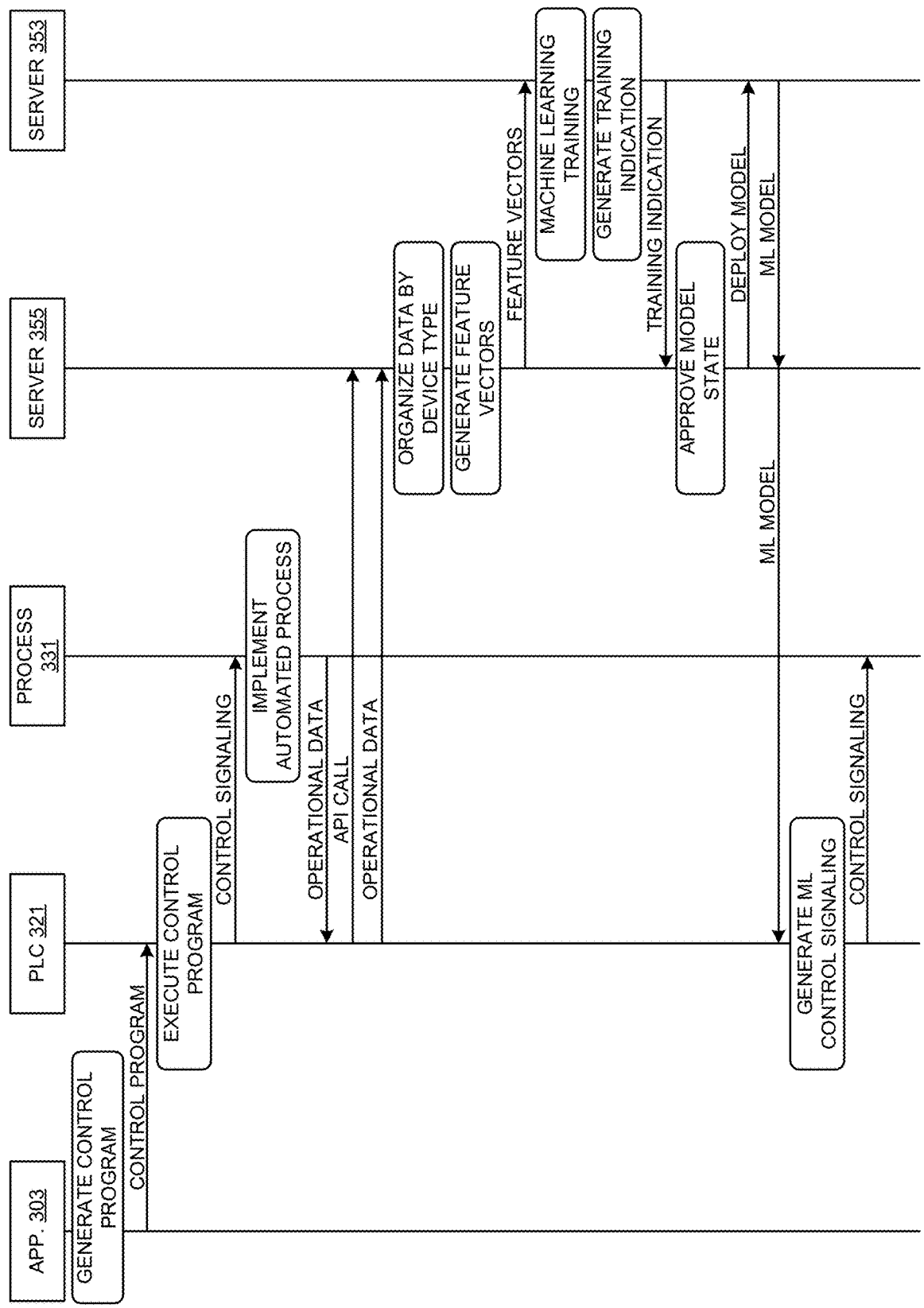
FIG. 4 illustrates an exemplary operation of an industrial automation environment to train machine learning systems to perform autonomous control.

FIG. 4 illustrates an exemplary operation of industrial automation environment 300 to train a machine learning model to perform autonomous control. The operation depicted by FIG. 4 comprises an example of process 200 illustrated in FIG. 2, however process 200 may differ. In other examples, the structure and operation of industrial automation environment 300 may be different.

In operation, application (APP.) 303 generates control program 305 comprising a set of program tags that form a ladder logic diagram. The program tags may comprise code chunks that, when executed by a PLC, dictate the operation of an automated industrial process. The program tags may comprise code that drives that start/stop of machine operations, reporting of variable metrics for a machine (e.g., temperature readouts), and/or other types of machine operations. For example, of the program tags may represent the viscosity of a substance in OEM device 341. Typically, application 303 receives user input from an operator via user interface 304 which drives application 303 to generate control program 305. Upon completion of control program 305, application 303 drives server 302 to transfer control program 305 to PLC 321. For example, transceiver circuitry in server 302 may upload control program 305 to PLC 321 over an industrial ethernet link.

PLC 321 receives control program 305 from application 303. PLC 321 executes control program 305 and responsively generates control signaling based on control program 305. PLC 321 transfers the control signaling to OEM devices 341-343 to drive the operation of automated industrial process 331. For example, OEM device 335 may comprise a heat exchanger and control program 305 may dictate a temperature differential setting for OEM 343. PLC 321 may execute control program 305 and determine a valve setting to achieve a cold-water flow rate that results in the desired temperature differential. PLC 321 may transfer control signaling to an actuator in OEM device 343 to achieve the desired valve setting. The actuator in OEM device 343 may receive the control signaling and set the valve to the position indicated by the control program 305.

Returning to the operation, OEM devices 341-343 of automated industrial process 331 receive the control signaling from PLC 321. OEM devices 341-343 implement automated industrial process 331 as dictated by control program 305. In this example, each OEM device comprises a different device class of OEM. For example, OEM device 341 may comprise a pump, OEM device 342 may comprise a heater, and OEM device 343 may comprise a reactor, however it should be appreciated that the device types of OEM devices 341-349 are not limited. As OEM devices 341-343 operate in response to the control signaling, they generate OEM operational data that characterizes their operations. For example, if OEM device 342 comprises a motor, it may generate OEM data that indicates it power output over time. It should be appreciated that the OEM data produced by OEM devices 341-349 may depend on their device classes and the type of industrial process they implement.

OEM devices 341-343 transfer their OEM operational data to PLC 321. PLC 321 receives the OEM data and responsively transfers API calls to API library 356 in server 355. The APIs that comprise API library 356 are organized by device class. PLC 321 transfers calls to APIs that correspond to the device class that generated the OEM operational data. For example, OEM device 343 may comprise a chemical reactor that generate OEM operational data. PLC 321 may transfer an API call to a chemical reactor API of API library 356 to ingest OEM data generated by OEM device 343. API library 356 acknowledges the calls and PLC 321 transfers the OEM operational data generated by OEM devices 341-343 to APIs of API library 356 that correspond to the device classes of OEM devices 341-343.

API library 356 in server 355 receives the OEM operational data and organizes the data by device class. For example, an API for industrial dryers may receive industrial dryer OEM data and store the industrial dryer data in a database for OEM industrial dryer data. API library 356 forwards OEM operational data for an OEM device class to extraction process 357. Extraction process 357 calculates derivative values for the OEM data of the device class and combines the derivative values into feature vectors that represent OEM data for that class of OEM device. Extraction process 357 generates the feature vectors so that the OEM data comprises a consumable data type for a machine learning model. Extraction process 357 in server 355 transfers the feature vectors for the OEM device class to server 353.

Server 353 receives the feature vectors and trains machine learning model 354 based on the feature vectors. Machine learning model 354 is trained to perform autonomous control of OEM devices that comprise the device class of the ingested feature vectors. Machine learning model 354 ingests the feature vectors and trains its machine learning algorithms based on the feature vectors. Machine learning model 354 outputs a training indication that indicates the training state of the model may comprise various autonomous control metrics. For example, the training indication may comprise machine learning predictions to control an industrial process as well as accuracy metrics that indicate how accurate the predictions were. Server 353 forwards the training indication to server 355 and server 355 presents the training indication on user interface 358 for review by a user. If the user is satisfied with the state of machine learning model 354, the user may direct servers 353 and 355 to deploy model 354. Alternatively, if the user is unsatisfied with the current stat of the model (e.g., prediction accuracy too low), the user may direct servers 353 and 355 to continue training machine learning model 354 until model 354 reaches a suitable training standard.

In this example, the user approves the model via user interface 358. Server 353 receives user inputs vie user interface 358 that indicate the approval. In response, server 353 directs server 353 to deploy machine learning model 354 to PLC 321 to autonomously control the OEM device class model 354 was trained to control. Server 353 deploys model 354 to PLC 321 via server 355. For example, PLC 354 may comprise a machine learning ASIC and memory configured to host and implement machine learning model 354.

Once deployed, machine learning model 354 ingests subsequent OEM operational generated by one or more of OEM devices 341-343 in process 331. Machine learning model 354 processes the subsequent OEM operational data using its trained machine learning algorithms and generates a machine learning output to control ones of OEM device 341-343 that comprise the device class model 354 was trained to control. The machine learning outputs comprise control signaling and PLC 321 transfers the machine learning generated control signaling to one or more of OEM devices 341-343. For example, when deployed, machine learning model 354 may receive OEM operational data generated by OEM device 341 and determine that OEM device 341 will fall out of a target operating range (e.g., operating temperature). Model 354 may then output control signaling to drive the actuators of OEM device 341 to prevent OEM device 341 from falling out of the target operating range. PLC 321 may then transfer the machine learning generated control signaling to the actuators of OEM device 341. By deploying model 354 to PLC 321, automated industrial environment 300 may autonomously control the operations of OEM devices to optimize, prevent errors, and maintain target value ranges in automated industrial process 331 without the need for human operator input.

Figure 5:
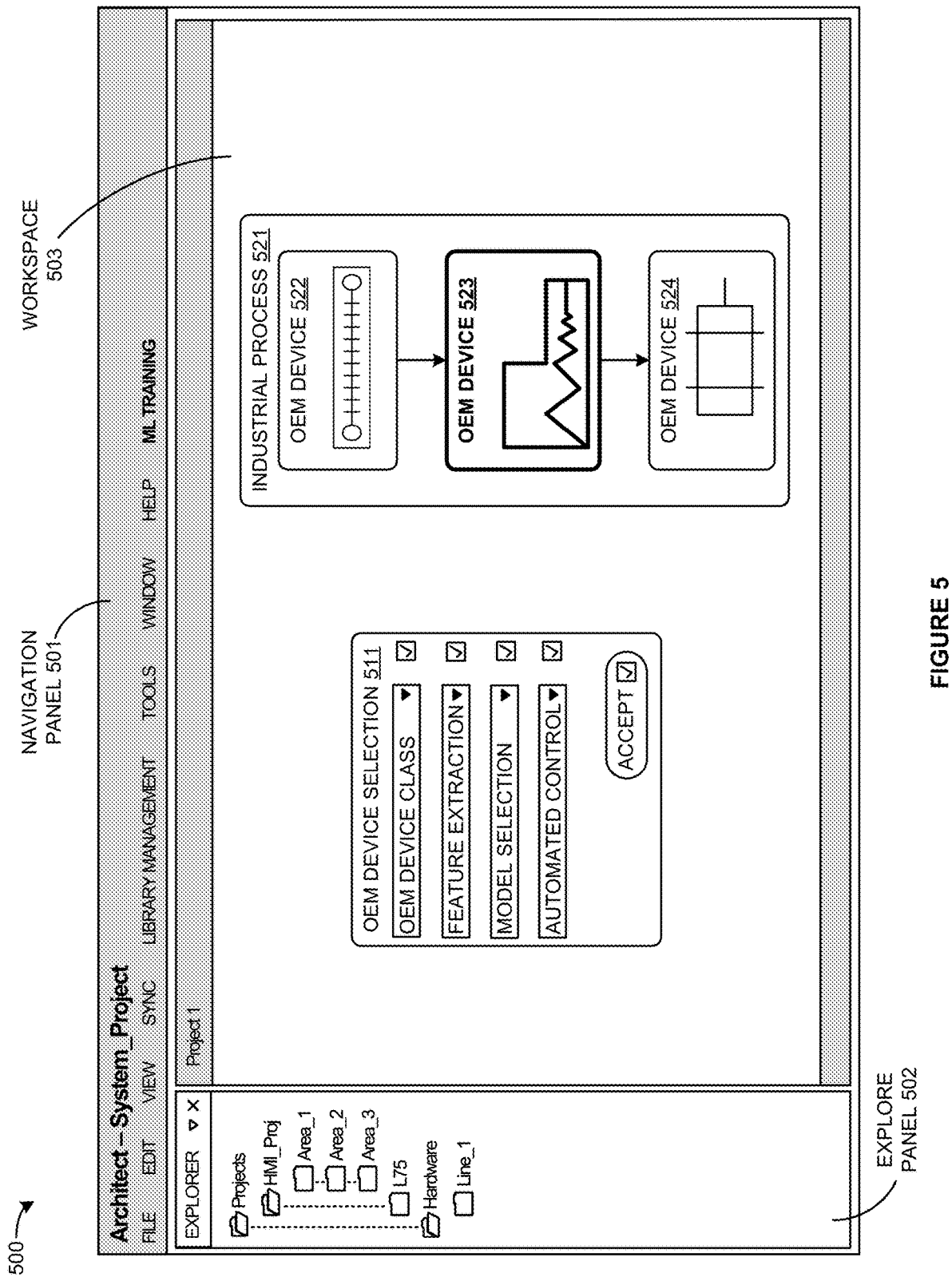
FIG. 5 illustrates an exemplary user interface in an industrial automation environment.

FIG. 5 illustrates user interface 500 to train a machine learning model to perform autonomous control. User interface 500 comprises an example of user interface 358, however user interface 358 may differ. User interface 500 comprises a data science environment of an automated industrial environment presented on a display screen which is representative of any user interface for generating control code. For example, user interface 501 may comprise a Guided User Interface (GUI) configured to allow a user to interact with machine learning training application (e.g., API library 356 and extraction process 357) to train a machine learning model to perform autonomous control of an OEM device class.

User interface 500 includes navigation panel 501 that allows a user to access the various features available through user interface. Navigation panel 501 comprises tabs like "FILE", "EDIT", "VIEW", "LIBRARY MANAGEMENT", "TOOLS", "WINDOW", "HELP", "ML TRAINING". In other examples, navigation panel 501 may comprise fewer tabs, more tabs, and/or different types of tabs. A user may select a tab to access the functionality of the tab. Upon selection, the tabs may open drop down menus that list their functionality. For example, a user may select the "ML TRAINING" tab and select an option from a drop-down menu to train a machine learning model to perform autonomous control of an OEM device. Navigation panel 501 is located on a top portion of user interface 500 however navigation panel 501 may be located on a different portion of user interface 500. For example, navigation panel 501 may be located on the bottom portion of user interface 500.

User interface 500 incudes explore panel 502. Explore 502 panel comprises a file navigation system that allows a user to access various projects and view information. The files comprise names like "Projects", "HMI_Proj", "Area_2", "Area_2", "Area_3", "L75", "Hardware", and "Line_1". The files are organized in a hierarchy. A user may select one of the files to access the contents stored within the file. For example, a user may select the "L75" folder to access its contents. Explore panel 502 is located on a left portion of user interface 500 however explore panel 502 may be located on a different portion of user interface 500. For example, explore panel 502 may be located on the right portion of user interface 500.

User interface 500 includes workspace 503. Workspace 503 comprises OEM device selection window 511 and industrial process window 521. OEM device selection 511 comprises options that allow a user to initiate the training a machine learning model to control a class of OEM devices. Industrial process window 521 comprises a visualization of an industrial processes imported to workspace 503. In this example, industrial process window 521 comprises OEM devices 522-524. In this example, each of OEM devices 522-524 comprises a different type/class of OEM device.

In some examples, a user selects one of the folder icons displayed in explore panel 502 to import industrial process window 521 to workspace 503. The user may also select the "ML TRAINING" tab in navigation panel 501 to display OEM device selection window 511. The user interacts with OEM device selection 511 to select an OEM device class, to configure feature extraction, to select machine learning model to train, and to select a training type like automated control training. Once the user has configured OEM device selection window 511 to their desired parameters, a user may select the "ACCEPT" button in OEM device selection window 511 to initiate training a machine learning model to perform autonomous control for an OEM device class.

Figure 6:
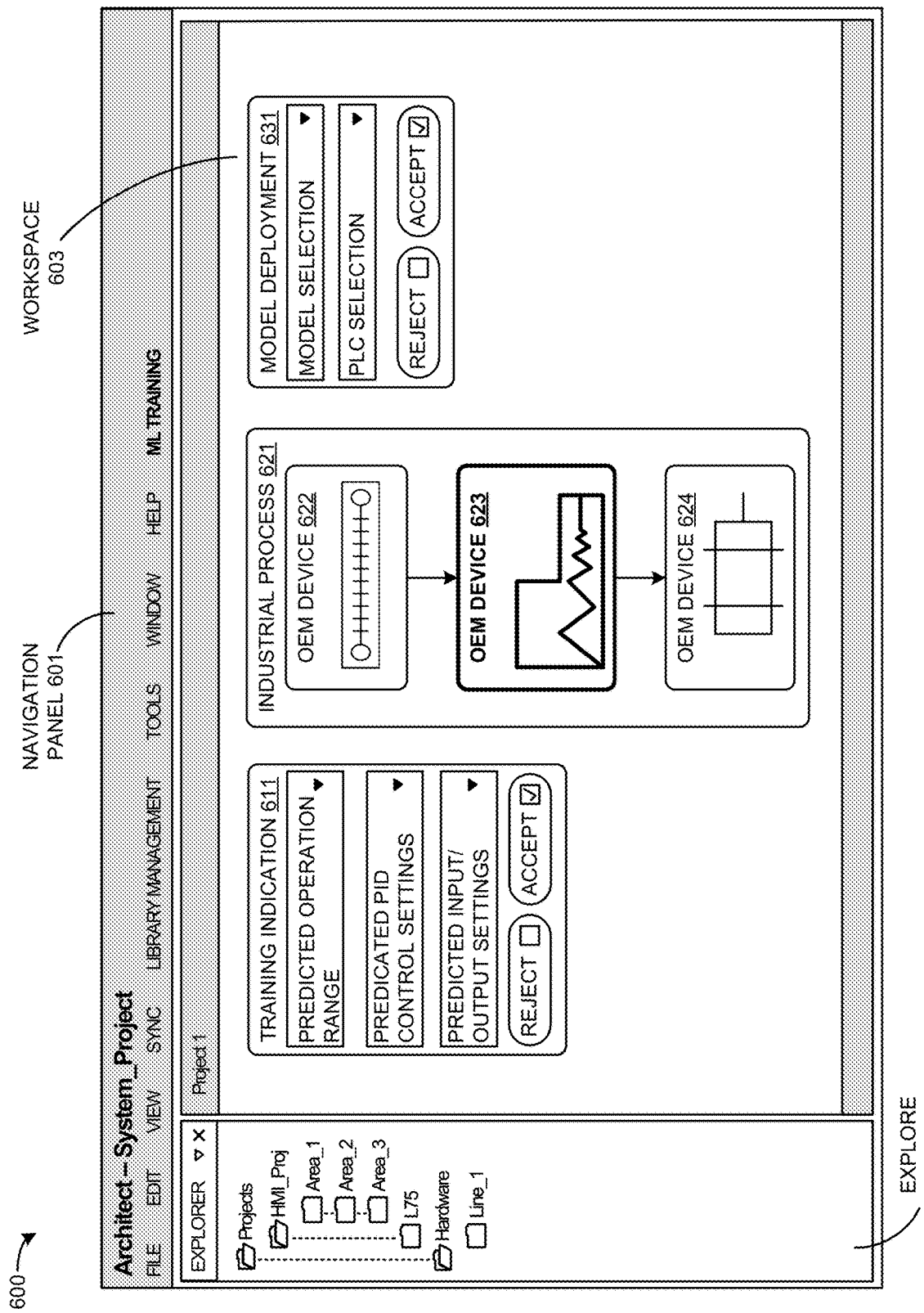
FIG. 6 illustrates an exemplary user interface in an industrial automation environment.

FIG. 6 illustrates user interface 600 to train a machine learning model to perform autonomous control. User interface 600 comprises an example of user interface 358, however user interface 358 may differ. User interface 600 comprises a data science environment of an automated industrial environment presented on a display screen which is representative of any user interface for generating control code. For example, user interface 601 may comprise a GUI configured to allow a user to interact with machine learning training application (e.g., API library 356 and extraction process 357) to train a machine learning model to perform autonomous control of an OEM device class.

User interface 600 includes navigation panel 601 that allows a user to access the various features available through user interface. Navigation panel 601 comprises tabs like "FILE", "EDIT", "VIEW", "LIBRARY MANAGEMENT", "TOOLS", "WINDOW", "HELP", and "ML TRAINING". In other examples, navigation panel 601 may comprise fewer tabs, more tabs, and/or different types of tabs. A user may select a tab to access the functionality of the tab. Upon selection, the tabs may open drop down menus that list their functionality. For example, a user may select the "FILE" tab and select an option from a drop-down menu to save a project to memory. Navigation panel 601 is located on a top portion of user interface 600 however navigation panel 601 may be located on a different portion of user interface 600. For example, navigation panel 601 may be located on the bottom portion of user interface 600.

User interface 600 incudes explore panel 602. Explore 602 panel comprises a file navigation system that allows a user to access various projects and view information. The files comprise names like "Projects," "HMI_Proj", "Area_2", "Area_2", "Area_3", "L75", "Hardware", and "Line_1". The files are organized in a hierarchy. A user may select one of the files to access the contents stored within the file. For example, a user may select the "L75" folder to access its contents. Explore panel 602 is located on a left portion of user interface 600 however, explore panel 602 may be located on a different portion of user interface 600. For example, explore panel 602 may be located on the right portion of user interface 600.

User interface 600 includes workspace 603. Workspace 603 comprises training indication window 611, industrial process window 621, and model deployment window 631. Training indication window 611 comprises options that allow a view the training state of a machine learning model. For example, after the user has initiated training a machine learning model, user interface 600 may display training indication window 611. Industrial process window 621 comprises a visualization of an industrial processes imported to workspace 603. In this example, industrial process window 621 comprises OEM devices 622-624. Training indication window 611 comprises options like predicted operation range, predicted PID control settings, and predicted input/output settings. Training indication window 611 comprises options that allows a user to accept or reject the training state of the machine learning model. When a user rejects the training state, the machine learning model may be further trained until a desired model state has been reached.

Alternatively, when a user accepts the training state of the model, user interface 600 may present model deployment window 631 in workspace 631. Model deployment window 631 comprises options to select a machine learning model to deploy and to select a PLC to deploy the model to. Upon selection of the "ACCEPT" button in model deployment window 631, the selected model may be deployed to the selected PLC to perform autonomous control of an OEM device class in an automated industrial process. In some examples, the machine learning model may be deployed to another type of controller. For example, the machine learning model may be deployed directly to an OEM device to control the operations of the OEM device. In some examples, the machine learning model may be deployed to third party systems outside of the automated industrial environment associated with user interface 600.

Figure 7:
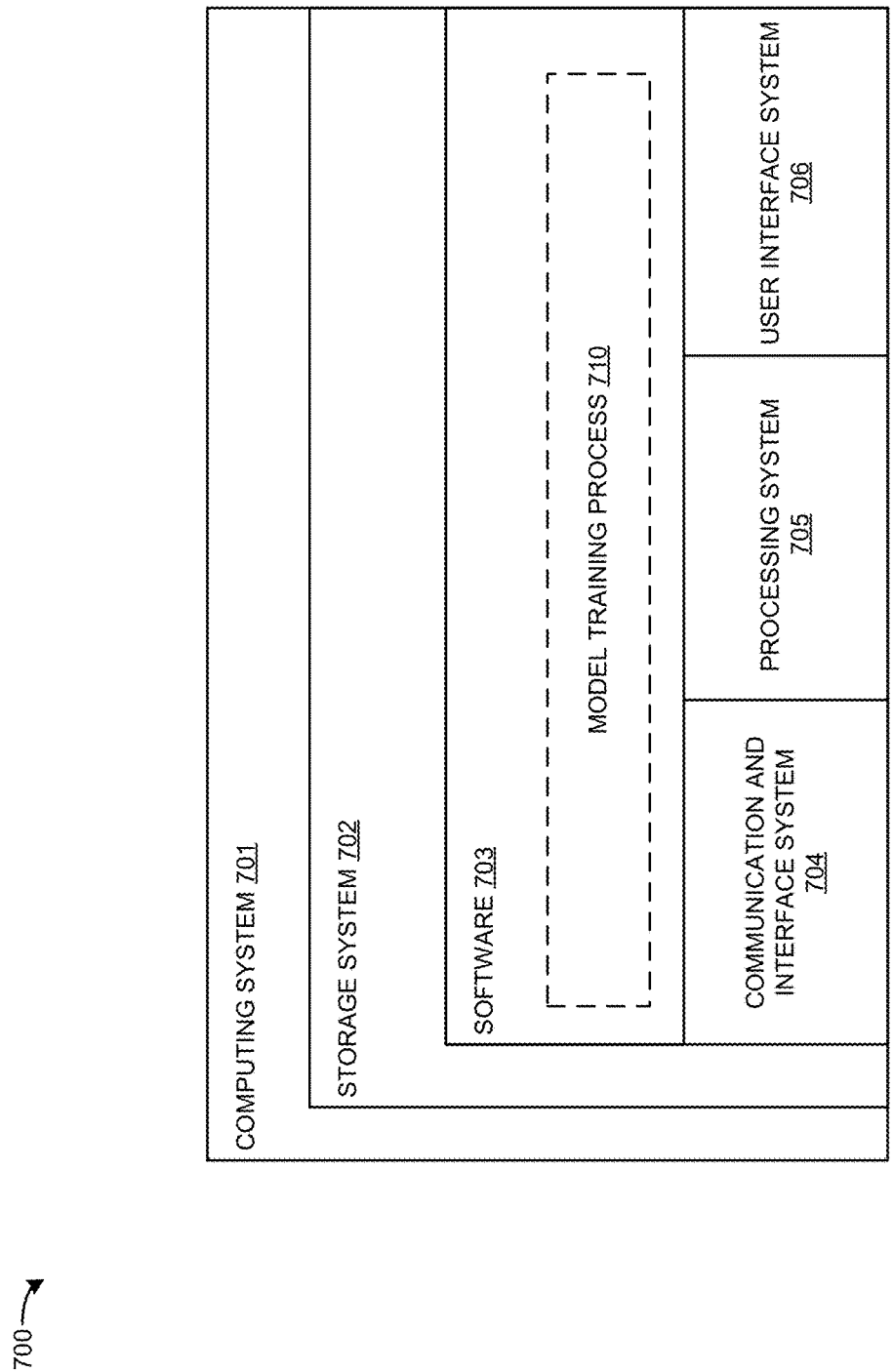
FIG. 7 illustrates an exemplary computing device that may be used in accordance with some embodiments of the present technology.

FIG. 7 illustrates computing system 701 to train a machine learning model to perform autonomous control implementation according to an implementation of the present technology. Computing system 701 is representative of any system or collection of systems with which the various operational architectures, processes, scenarios, and sequences disclosed herein for utilizing machine learning models within industrial automation environments may be employed. For example, computing system 701 may be representative of computing device 101, machine learning model repository 112, PLCs 123-123, server 302, PLCs 321-323, data center 352, and/or any other computing device contemplated herein. Computing system 701 may be implemented as a single apparatus, system, or device or may be implemented in a distributed manner as multiple apparatuses, systems, or devices. Computing system 701 includes, but is not limited to, processing system 704, storage system 702, software 706, communication interface system 703, and user interface system 705. Processing system 704 is operatively coupled with storage system 702, communication interface system 703, and user interface system 705.

Processing system 704 loads and executes software 706 from storage system 702. Software 706 includes and implements machine learning training process 710, which is representative of any of the machine learning analysis processes discussed with respect to the preceding Figures, including but not limited to the industrial control, target variable optimization, and variable correlation operations. For example, machine learning training process 710 may be representative of process 200 illustrated in FIG. 2 and/or the exemplary operation of environment 300 illustrated in FIG. 4. When executed by processing system 704 to train a machine learning model, software 706 directs processing system 704 to operate as described herein for at least the various processes, operational scenarios, and sequences discussed in the foregoing implementations. Computing system 701 may optionally include additional devices, features, or functionality not discussed for purposes of brevity.

Processing system 704 may comprise a micro-processor and other circuitry that retrieves and executes software 706 from storage system 702. Processing system 704 may be implemented within a single processing device but may also be distributed across multiple processing devices or sub-systems that cooperate in executing program instructions. Examples of processing system 704 include general purpose central processing units, graphical processing units, application specific processors, and logic devices, as well as any other type of processing device, combinations, or variations thereof.

Storage system 702 may comprise any computer readable storage media readable by processing system 704 and capable of storing software 706. Storage system 702 may include volatile, nonvolatile, removable, and/or non-removable media implemented in any method or technology for storage of information, such as computer readable instructions, data structures, program modules, or other data.

Examples of storage media include random access memory, read only memory, magnetic disks, optical disks, optical media, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 702 may also include computer readable communication media over which at least some of software 706 may be communicated internally or externally. Storage system 702 may be implemented as a single storage device but may also be implemented across multiple storage devices or sub-systems co-located or distributed relative to each other. Storage system 702 may comprise additional elements, such as a controller, capable of communicating with processing system 704 or possibly other systems.

Software 706 (including machine learning training process 710) may be implemented in program instructions and among other functions may, when executed by processing system 704, direct processing system 704 to operate as described with respect to the various operational scenarios, sequences, and processes illustrated herein. For example, software 706 may include program instructions for generating feature vectors to represent OEM data for a class of OEM devices to train a machine learning model as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 706 may include additional processes, programs, or components, such as operating system software, virtualization software, or other application software. Software 706 may also comprise firmware or some other form of machine-readable processing instructions executable by processing system 704.

In general, software 706 may, when loaded into processing system 704 and executed, transform a suitable apparatus, system, or device (of which computing system 701 is representative) overall from a general-purpose computing system into a special-purpose computing system customized to train and deploy machine learning models in an industrial automation environment as described herein. Indeed, encoding software 706 on storage system 702 may transform the physical structure of storage system 702. The specific transformation of the physical structure may depend on various factors in different implementations of this description. Examples of such factors may include, but are not limited to, the technology used to implement the storage media of storage system 702 and whether the computer-storage media are characterized as primary or secondary storage, as well as other factors.

For example, if the computer readable storage media are implemented as semiconductor-based memory, software 706 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 703 may include communication connections and devices that allow for communication with other computing systems (not shown) over communication networks (not shown). Examples of connections and devices that together allow for inter-system communication may include network interface cards, antennas, power amplifiers, radiofrequency circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing system 701 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of networks, or variation thereof. The aforementioned communication networks and protocols are well known and an extended discussion of them is omitted for the sake of brevity.

While some examples provided herein are described in the context of computing devices for machine learning training, it should be understood that the condition systems and methods described herein are not limited to such embodiments and may apply to a variety of other extension implementation environments and their associated systems. As will be appreciated by one skilled in the art, aspects of the present invention may be embodied as a system, method, computer program product, and other configurable systems. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number, respectively. The word "or" in reference to a list of two or more items, covers all of the following interpretations of the word: any of the items in the list, all of the items in the list, and any combination of the items in the list.

The phrases "in some embodiments," "according to some embodiments," "in the embodiments shown," "in other embodiments," and the like generally mean the particular feature, structure, or characteristic following the phrase is included in at least one implementation of the present technology and may be included in more than one implementation. In addition, such phrases do not necessarily refer to the same embodiments or different embodiments.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for" but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A system to train machine learning systems to perform autonomous control in an industrial automation environment, the system comprising:
a memory that stores executable components; and
a processor, operatively coupled to the memory, that executes the executable components, the executable components comprising:
a data aggregation component configured to receive operational data generated by Original Equipment Manufacturer (OEM) devices, identify a device type for the operational data, and transfer the operational data for the device type to a machine learning interface component wherein the operational data characterizes the operations of the OEM devices;
the machine learning interface component configured to receive the operational data for the device type, generate feature vectors based on the operational data configured for ingestion by a machine learning model, and transfer the feature vectors to a machine learning model; and
the machine learning interface component configured to receive a training indication from the machine learning model that indicates an autonomous control output for the device type of the OEM devices.

2. The system of claim 1 further comprising:
the machine learning model configured to receive the feature vectors from the machine learning interface component, process the feature vectors to train machine learning algorithms for autonomous control of the device type of the OEM devices, generate the training indication, and transfer the training indication to the machine learning interface component.

3. The system of claim 1 wherein the data aggregation component comprises a set of Application Programming Interfaces (APIs) that correspond to different device types for the OEM for the OEM devices.

4. The system of claim 3 further comprising:
an OEM data component configured to call one of the APIs that corresponds to the device type associated with the OEM data component and transfer the operational data for the device type to the one of the APIs; and wherein:
the data aggregation component configured to receive the operational data and identify the device type for the operational data comprises the one of the APIs configured to receive the call, receive the operational data, and identify the device type based on the call.

5. The system of claim 4 wherein the OEM data component comprises a Programmable Logic Controller (PLC) configured to control the OEM devices.

6. The system of claim 1 wherein the machine learning interface component configured to generate feature vectors based on the operational data comprises the machine learning interface component configured to calculate derivative values that represent the operational data and generate the feature vectors based on the derivative values.

7. The system of claim 1 further comprising:
a Programmable Logic Controller (PLC) configured to receive additional operational data for the OEM devices, generate additional feature vectors based on the additional operational data, and transfer the feature vectors to the machine learning model;
the machine learning model configured to receive the additional feature vectors from the PLC and generate a machine learning output that comprises control signaling for the OEM devices, and transfer the machine learning output to the PLC; and
the PLC configured to receive the machine learning output from the machine learning model and implement the control signaling in the OEM devices.

8. A method to train machine learning systems to perform autonomous control in an industrial automation environment, the method comprising:
a data aggregation component receiving operational data generated by Original Equipment Manufacturer (OEM) devices, identifying a device type for the operational data, and transferring the operational data for the device type to a machine learning interface component wherein the operational data characterizes the operations of the OEM devices;
the machine learning interface component receiving the operational data for the device type, generating feature vectors based on the operational data configured for ingestion by a machine learning model, and transferring the feature vectors to a machine learning model; and
the machine learning interface receiving a training indication from the machine learning model that indicates an autonomous control output for the device type of the OEM devices.

9. The method of claim 8 further comprising:
the machine learning model receiving the feature vectors from the machine learning interface component, processing the feature vectors to train machine learning algorithms for autonomous control of the device type of the OEM devices, generating the training indication, and transferring the training indication to the machine learning interface component.

10. The method of claim 8 wherein the data aggregation component comprises a set of Application Programming Interfaces (APIs) that correspond to different device types for the OEM for the OEM devices.

11. The method of claim 10 further comprising:
an OEM data component calling one of the APIs that corresponds to the device type associated with the OEM data component and transferring the operational data for the device type to the one of the APIs; and wherein:
the data aggregation component receiving the operational data and identifying the device type for the operational data comprises the one of the APIs receiving the call, receiving the operational data, and identifying the device type based on the call.

12. The method of claim 11 wherein the OEM data component comprises a Programmable Logic Controller (PLC) configured to control the OEM devices.

13. The method of claim 8 wherein the machine learning interface component generating feature vectors based on the operational data comprises the machine learning interface component calculating derivative values that represent the operational data and generating the feature vectors based on the derivative values.

14. The method of claim 8 further comprising:
a Programmable Logic Controller (PLC) receiving additional operational data for the OEM devices, generating additional feature vectors based on the additional operational data, and transferring the feature vectors to the machine learning model;

the machine learning model receiving the additional feature vectors from the PLC and generating a machine learning output that comprises control signaling for the OEM devices, and transferring the machine learning output to the PLC; and the PLC receiving the machine learning output from the machine learning model and implementing the control signaling in the OEM devices.

15. A non-transitory computer-readable medium storing instructions to train machine learning systems to perform autonomous control in an industrial automation environment, wherein the instructions, in response to execution by a processor, cause the processor to drive a system to perform operations comprising:

receiving operational data generated by Original Equipment Manufacturer (OEM) devices and identifying a device type for the operational data wherein the operational data characterizes the operations of the OEM devices;

generating feature vectors based on the operational data configured for ingestion by a machine learning model and transferring the feature vectors to a machine learning model; and receiving a training indication from the machine learning model that indicates an autonomous control output for the device type of the OEM devices.

16. The non-transitory computer-readable medium of claim 15, the operations further comprising:

receiving and processing the feature vectors to train machine learning algorithms for autonomous control of the device type of the OEM devices, generating the training indication, and transferring the training indication.

17. The non-transitory computer-readable medium of claim 15, further comprising a set of Application Programming Interfaces (APIs) that correspond to different device types for the OEM for the OEM devices.

18. The non-transitory computer-readable medium of claim 17, the operations further comprising:

calling one of the APIs that corresponds to the device type associated with the operational data and identifying the device type for the OEM data based on the call and the one of the APIs.

19. The non-transitory computer-readable medium of claim 17, the operations further comprising:

calculating derivative values that represent the operational data and generate the feature vectors based on the derivative values.

20. The non-transitory computer-readable medium of claim 17, the operations further comprising:

receiving additional operational data for the OEM devices, generating additional feature vectors based on the additional operational data, and transferring the feature vectors to the machine learning model, and receiving a machine learning output comprising control signaling from the machine learning model and implementing the control signaling in the OEM devices.

* * * * *